US011492959B2

(12) United States Patent
Carnevale et al.

(10) Patent No.: US 11,492,959 B2
(45) Date of Patent: Nov. 8, 2022

(54) STEERING ROD FOR TURBOCHARGERS AND METHOD FOR MAKING IT

(71) Applicant: FAIST COMPONENTI S.P.A., Montone (IT)

(72) Inventors: Domenico Carnevale, Perugia (IT); Andrea Asfalti, Perugia (IT)

(73) Assignee: FAIST COMPONENTI S.P.A., Montone (IT)

( * ) Notice: Subject to any disclaimer, the term of this patent is extended or adjusted under 35 U.S.C. 154(b) by 0 days.

(21) Appl. No.: 17/476,143

(22) Filed: Sep. 15, 2021

(65) Prior Publication Data

US 2022/0099019 A1   Mar. 31, 2022

(30) Foreign Application Priority Data

Sep. 30, 2020  (IT) .................. 102020000023056

(51) Int. Cl.
| | |
|---|---|
| *F02B 37/18* | (2006.01) |
| *F01D 17/10* | (2006.01) |
| *F02B 39/00* | (2006.01) |
| *F16C 7/02* | (2006.01) |
| *F16C 7/04* | (2006.01) |

(52) U.S. Cl.
CPC ............ *F02B 37/186* (2013.01); *F01D 17/10* (2013.01); *F02B 39/00* (2013.01); *F16C 7/02* (2013.01); *F16C 7/04* (2013.01); *F05D 2220/40* (2013.01); *F05D 2260/36* (2013.01); *F05D 2260/50* (2013.01)

(58) Field of Classification Search
CPC ........ F02B 37/186; F02B 39/00; F02B 37/24; F01D 17/10; F01D 17/105; F01D 17/165; F16C 7/02; F16C 7/04; F16C 7/023; F16C 9/04; F05D 2220/40; F05D 2260/36; F05D 2260/50; B21K 25/00; B23P 11/00; B23P 15/00; B23P 11/005; F16B 21/065
See application file for complete search history.

(56) References Cited

U.S. PATENT DOCUMENTS

2004/0232607 A1   11/2004   Bodin

FOREIGN PATENT DOCUMENTS

| DE | 2244945 | 3/1974 |
|---|---|---|
| DE | 102017202961 A1 | 8/2018 |
| EP | 1291121 A2 | 3/2003 |
| EP | 1452750 A2 | 9/2004 |

(Continued)

*Primary Examiner* — Audrey B. Walter
*Assistant Examiner* — Edward Bushard
(74) *Attorney, Agent, or Firm* — Pearne & Gordon LLP

(57) ABSTRACT

Steering rod for connecting an actuator to a turbocharger drive member, comprising an elongated main body (2), which extends between a first end (5) equipped with a first through-hole (7), and a second end (6) equipped with a second through-hole (8), and two bushings (3), (4) immovably mounted in the through-holes (7), (8), wherein the bushings (3), (4) are made of a material which has a greater resistance to mechanical wear than the material delimiting the through-holes (7), (8), and wherein each bushing (3) (4) has an outer surface that is in contact with an inner part of the through-hole (7), (8) and has a radial recess (9), the second material tightening the bushing (3), (4) preventing it from rotating and filling the recess (9) preventing the bushing (3), (4) from being extracted from the second through-hole (7), (8).

12 Claims, 5 Drawing Sheets

(56) References Cited

FOREIGN PATENT DOCUMENTS

| WO | 2018005254 A1 | 1/2018 |
| WO | 2020023372 A1 | 1/2020 |
| WO | WO-2020023372 A1 * | 1/2020 |

* cited by examiner

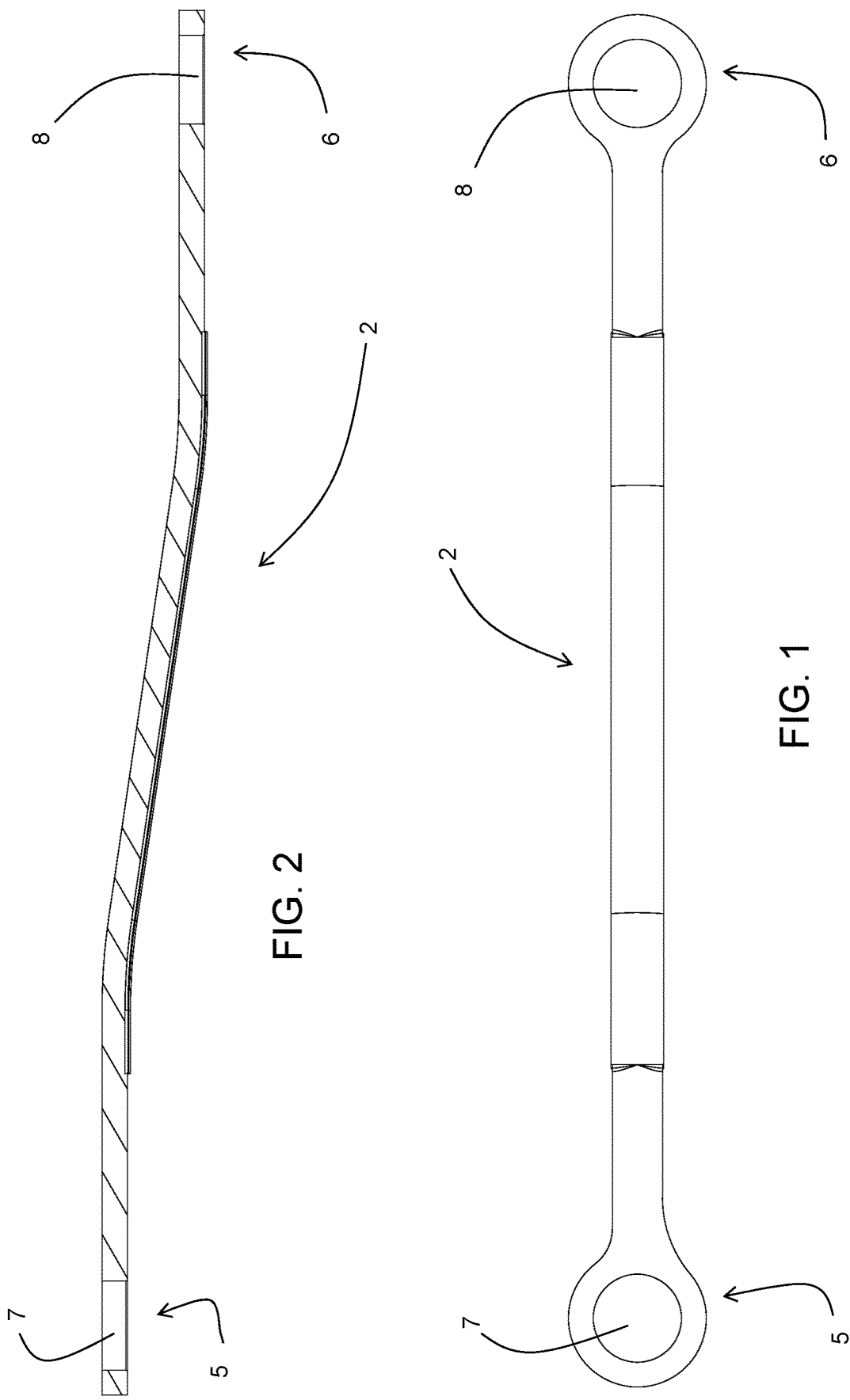

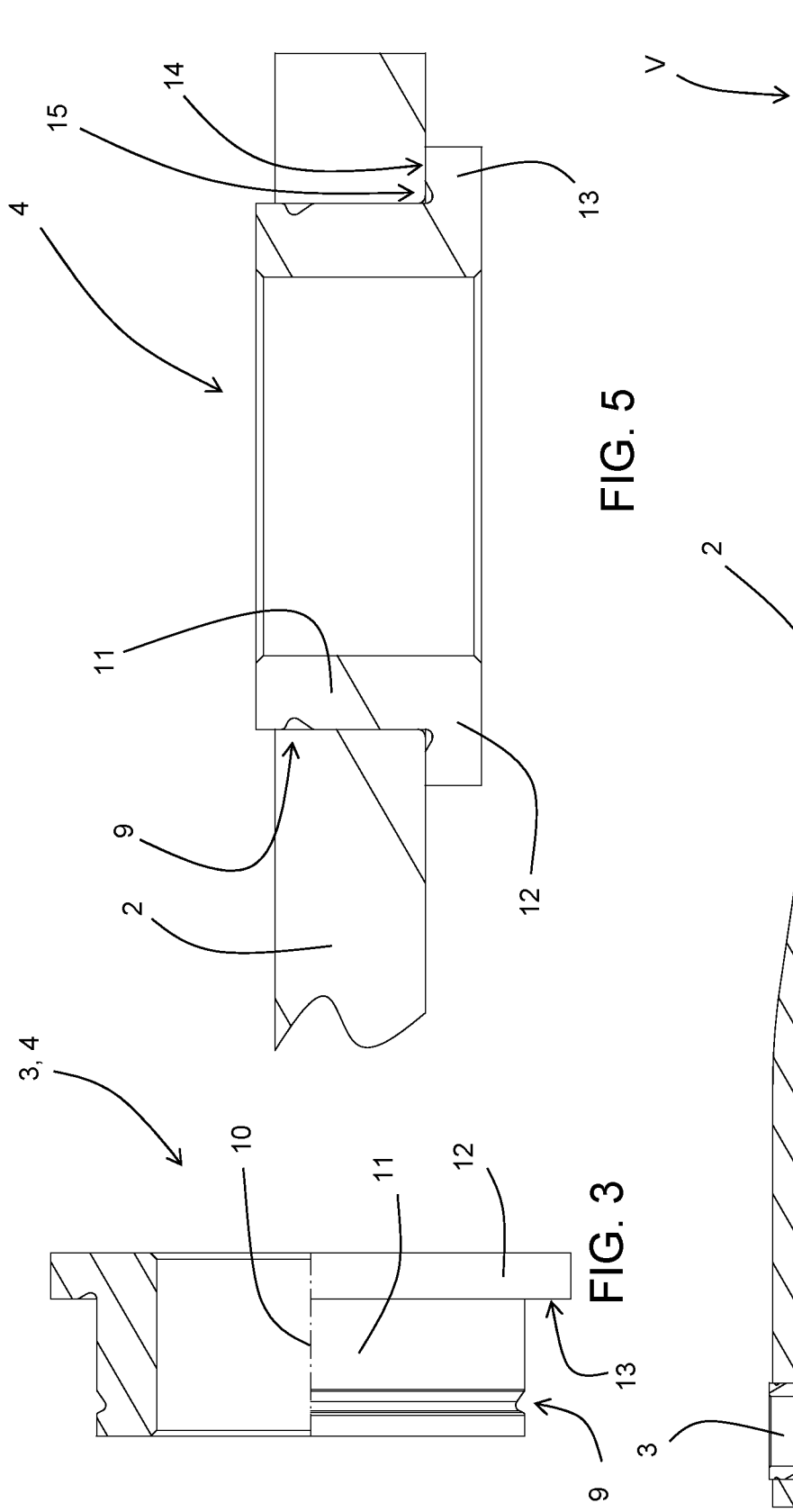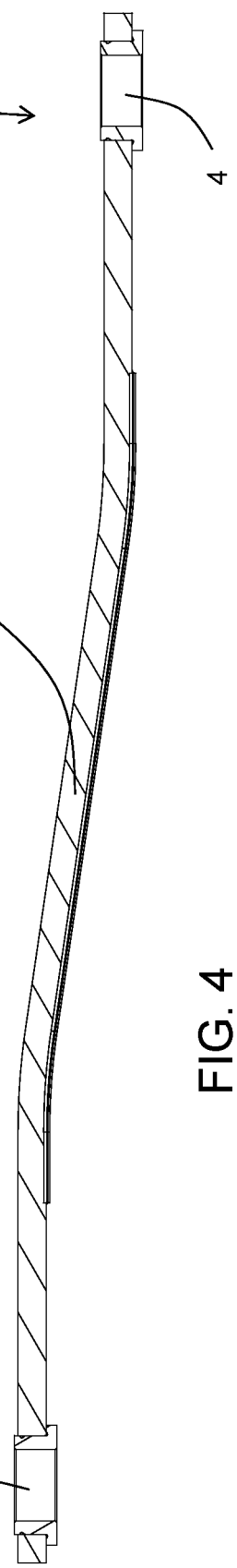

STEERING ROD FOR TURBOCHARGERS AND METHOD FOR MAKING IT

The present invention relates to a steering rod for turbochargers and a method for making it.

In the context of the present invention, and consistently with the terminology commonly used in the field of engines and turbochargers, steering rod means the rod connecting the drive actuator (linear or rotary) to a functional drive part located inside the turbocharger.

As is known, for example, in some applications each turbocharger assembly may comprise a single actuator and a single steering rod both to drive the movable blades of the turbine and to regulate the suction section of the charger. In other applications the turbocharger assembly may instead comprise two actuators and two steering rods: an actuator and a steering rod to drive the movable blades of the turbine; and an actuator and a steering rod to regulate the suction section of the charger.

Additionally, steering rods can also be used to control the operation of other elements of turbochargers, such as wastegate valves.

Each steering rod is an elongated element extending between a first end and a second end. At each end is a through-hole through which the steering rod, when in use, connects to the actuator and the drive unit of the turbocharger respectively.

Clearly, the steering rod is an element subjected to high temperatures and considerable repetitive mechanical stress, which negatively impact it in terms of wear, in particular in those areas where the steering rod interfaces with the other elements (in other words, at the two through-holes).

According to the manufacturing solutions currently used in the sector, in order to meet anti-wear requirements, steering rods are on the one hand made from high-performance metal materials and, at least for some applications, are sometimes subjected to heat or heat-diffusion treatment aimed at increasing their anti-wear performance Clearly, this technology has the significant drawback of having a relatively high production cost.

In this context, the technical purpose of the present invention is to make a steering rod for turbochargers and to implement a method for making it which offer a solution to the issues mentioned above.

In particular, the technical purpose of the present invention is to develop a steering rod for turbochargers, and a method to make it, which should have a significantly lower cost than has been the case in the market up to now, with at least an equivalent anti-wear performance.

The technical purpose and the aims indicated above are substantially achieved by a steering rod for turbochargers, and by a method for making it, in accordance with the contents of the accompanying claims.

Further features and the advantages of the present invention will become more apparent upon careful reading of the detailed description of several preferred, non-limiting embodiments of a steering rod for turbochargers, and a method for making it, as shown in the accompanying drawings, in which:

FIG. 1 shows a plan view of an elongated main body of a steering rod made according to the present invention;

FIG. 2 shows the main body in FIG. 1, axially cross-sectioned;

FIG. 3 shows a side view—half in whole and half cross-sectioned—of a bushing constituting part of the steering rod according to the present invention;

FIG. 4 shows the main body in FIG. 2, on which are mounted two bushings of the type shown in FIG. 3;

FIG. 5 shows an enlargement of detail V in FIG. 4;

Figure 6:
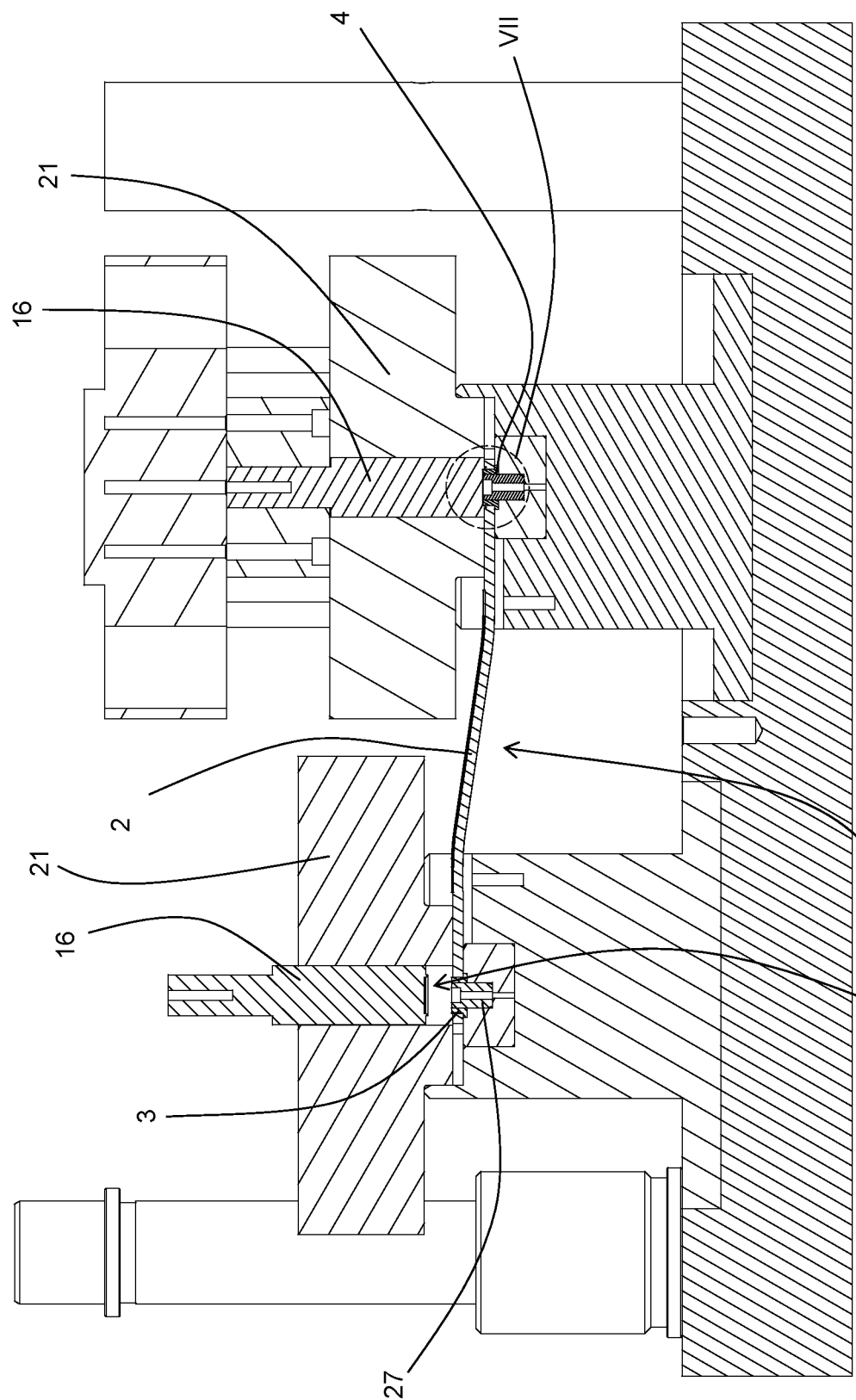
FIG. 6 shows a schematic lateral cross-sectioned view of an apparatus performing a step of mounting bushings on a main body in accordance with the present invention.

The innovative idea underlying the present invention is to replace the traditional one-piece steering rods with a unit consisting of several parts, and to introduce bushings as elements interfacing between the steering rod and the other parts of the turbocharger assembly, localising the use of materials and treatments aimed at guaranteeing the requisite high anti-wear performance only in those bushings. This has made it possible to maintain the same performance as the best traditional products, while at the same time lowering product costs and over-engineering.

According to the first innovative aspect of the present invention, the steering rod 1 therefore comprises an elongated main body 2, a first bushing 3 and a second bushing 4.

The elongated main body 2, advantageously consisting of a single part, extends between a first end 5 and a second end 6.

Overall, the elongated main body 2 has an elongated shape, but can extend either along a rectilinear trajectory or along more articulated trajectories (such as that shown in FIG. 3).

In the first end 5 of the elongated main body 2, a first through-hole 7 is made, while in the second end 6 a second through-hole 8 is made.

The first bushing 3 is immovably mounted in the first through-hole 7 and the second bushing 4 is immovably mounted in the second through-hole 8.

The first bushing 3 and the second bushing 4 are made with a respective first material (which may or may not be the same for both), which has a greater resistance to mechanical wear than a second material which delimits the first through-hole 7 and the second through-hole 8 respectively. Advantageously, the second material constitutes the entire elongated main body 2.

A completely assembled steering rod 1, the first bushing 3 has an outer surface that is in contact with an inner part of the first through-hole 7. The outer surface of the first bushing 3 also has a radial recess 9, which extends towards a central axis of the same first bushing 3, in such a way as to define a seat undercutting a line parallel to the central axis 10. Moreover, the second material delimiting the first through-hole 7 tightens the first bushing 3 preventing it from rotating freely around the central axis 10; in other words, the first bushing 3 is mounted on the first through-hole 7 without any backlash (but rather it is bound to the elongated main body 2 in a similar way as can be obtained by interference fitting). Furthermore, the second material fills the recess 9 in the outer surface of the first bushing 3 preventing the first bushing 3 from being extracted from the first through-hole 7.

Likewise, the second bushing 4 has an outer surface that is in contact with an inner part of the second through-hole 8. The outer surface also has a radial recess 9, which extends towards a central axis 10 of the same second bushing 4, in such a way as to define a seat undercutting a line parallel to the central axis 10. Moreover, the second material delimiting the second through-hole 8 tightens the second bushing 4 preventing it from rotating freely around the central axis 10; as with the first bushing 3, the second bushing 4 is also mounted on the second through-hole 8 without any backlash. Finally, the second material fills the recess 9 in the outer surface of the second bushing 4 preventing the second bushing 4 from being extracted from the second through-hole 8.

In the preferred embodiment shown in the accompanying figures, the recesses 9 of the first bushing 3 and the second bushing 4 each consist of a first radial annular groove, which is centred on the central axis 10 and faces radially outwards (meaning that the open part of the groove faces radially outwards relative to the central axis 10, as illustrated in FIG. 3).

In some embodiments not shown, from the outside the first bushing 3 and the second bushing 4 have a substantially cylindrical shape.

Figure 7:
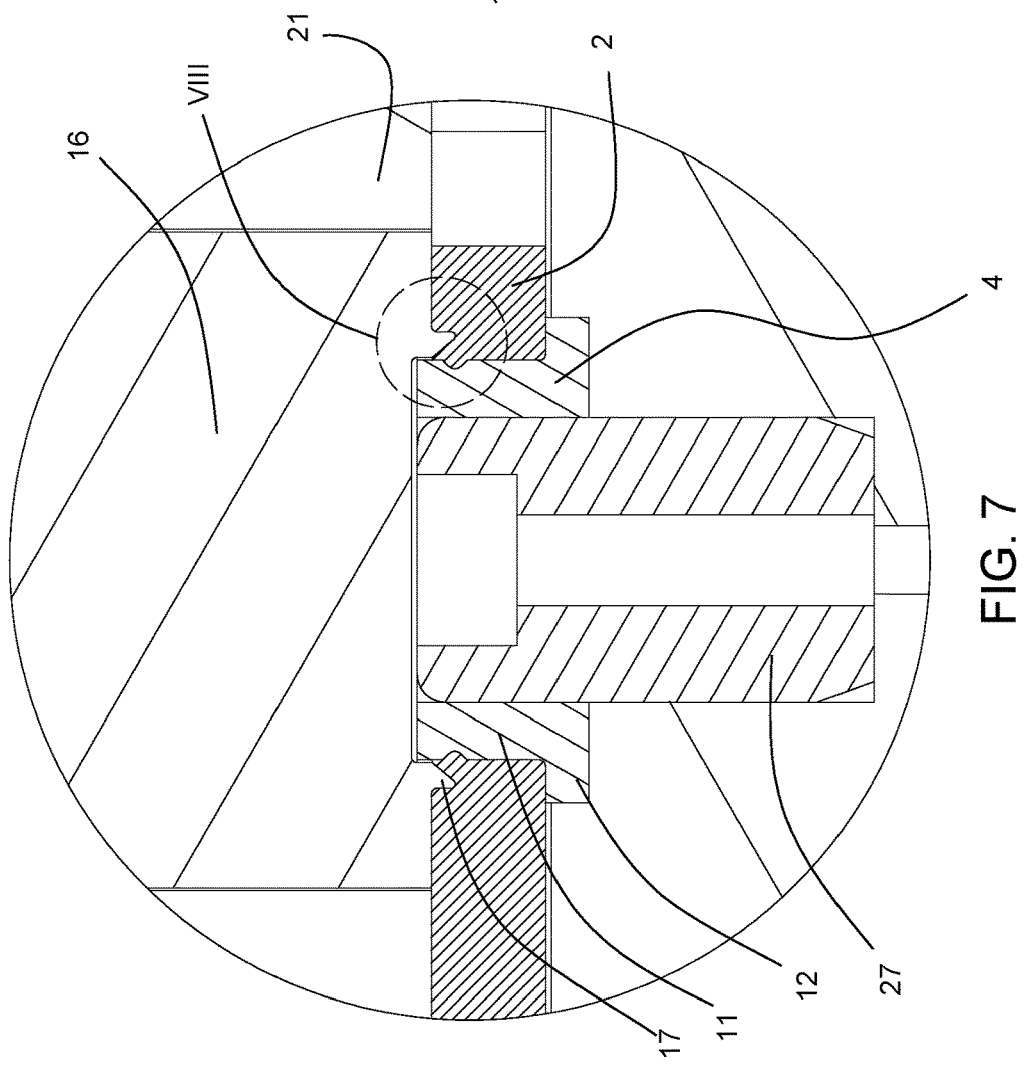
FIG. 7 shows an enlargement of detail VII in FIG. 6.

In some embodiments, such as those shown in FIGS. 3 and 7, the first bushing 3 and the second bushing 4 instead each comprise a first portion 11 and a second portion 12 axially arranged one after the other. The first portion 11 is inserted into the respective through-hole 7, 8, whereas the second portion 12 is supported on the elongated main body 2. For this purpose, the second portion 12 protrudes radially outwards from the first portion 11 (in the embodiments shown in which both portions are substantially cylindrical, the second portion 12 has a larger diameter). In other words, the second portion 12 constitutes a shoulder 13 which is supported on the elongated main body 2; in the accompanying figures, the shoulder 13 is formed by the surface perpendicular to the central axis 10 and facing the elongated main body 2 (hereinafter referred to as the support surface 14).

Each first portion 11 presents, on the outside, a first surface parallel to the central axis 10 in which the above-mentioned recess 9 is made.

In some embodiments (in FIG. 3, not in FIGS. 7 and 8), such first surface is joined to the support surface 14 of the second portion 12 by means of a second annular groove 15 made in the shoulder 13 and facing the elongated main body 2. The second annular groove 15 is centred on the central axis 10, and its opening lies in the plane perpendicular to the central axis 10.

The purpose of the second annular groove 15 is to house a corresponding positive sharp edge which is (or may be) present on the rim of the first through-hole 7 and/or of the second through-hole 8 respectively. In fact, this enables an optimal support between the surface of the shoulder 13 and that of the elongated main body 2, even in the event of possible imperfections due to the process of manufacturing the elongated main body 2, and in particular, of making the through-hole.

Turning now to the method for making a steering rod 1 according to the present invention, the description below regarding the method should be considered as referring also to the steering rod 1 and vice versa.

The method according to the present invention is that which, in the opinion of the applicant, enables the above-described steering rod 1 to be best made.

The method first of all envisages making the three main components which will then have to be assembled: namely, the elongated main body 2, the first bushing 3 and the second bushing 4 (FIG. 3).

Once the elongated main body 2 has been made, or as it is being made, the method envisages piercing the first end 5 to make the first through-hole 7 and piercing the second end 6 to make the second through-hole 8, obtaining the object illustrated in FIG. 1. The first through-hole 7 and the second through-hole 8 are configured to house the first bushing 3 and the second bushing 4 respectively; in particular, both are sized in such a way as to allow the respective bushing 3, 4 to be inserted with hardly any backlash (preferably with a backlash of two-tenths of a milimeter).

In some embodiments, the elongated main body 2 is made by a cold-moulding process, followed by blanking or broaching.

Particular attention should be paid to making the through-holes 7, 8, which should preferably be performed by blanking.

In one embodiment, broaching is used. With this technique, the hole is pierced in several steps by blanking successive holes of increasing size, until reaching a size that is a few one-hundreds smaller than the nominal size required. At this point, a spherical tool is inserted inside the hole enabling it to have a surface with no tearing of material throughout the thickness of the piece and to have tolerances of a few hundredths.

In a different embodiment, semi-fine blanking is instead used, where the tolerances between the die and the punch are tighter than in traditional blanking, which makes it possible to obtain a surface without tears for more than 80% of the thickness.

The first bushing 3 and the second bushing 4 are made with a material which has a greater resistance to mechanical wear than that of the material which delimits the first through-hole 7 and the second through-hole 8 (this material advantageously constitutes the elongated main body 2 entirely, or at least the first end 5 and the second end 6). In one embodiment, the bushings are made of hardened (e.g. Kolsterising) DIN 1.4571 stainless steel and the elongated main body 2 is made of untreated AISI 304.

In the preferred embodiment, the first bushing 3 and the second bushing 4 are made by means of turning.

At the same time as or after making each bushing 3, 4, the radial recess 9 is also made, together with the second annular groove 15 on its outer surface, where appropriate (FIG. 3). These too can be obtained by means of turning. Once the various parts are arranged, the method foresees the first bushing 3 and the second bushing 4 being inserted into the first through-hole 7 and the second through-hole 8 respectively. For bushings 3, 4 provided with a shoulder 13, this insertion brings the shoulder 13 up against the elongated main body 2 (FIG. 4).

Once the bushings 3, 4 are in position, the method envisages a twofold punching step in which a punch is pushed (driven) into each end of the elongated main body 2 around, and in proximity to, each bushing 3, 4 (acting from the side opposite that where the shoulder 13 of the bushing 3, 4 is resting). The punch is sized to penetrate the elongated main body 2 only partly and is shaped so as to deform the end of the elongated main body 2 by pushing the material constituting it both against an outer surface of the first bushing 3, to clamp it into the elongated main body 2, and inside the radial recess 9 of the first bushing 3, to prevent axial movements thereof relative to the elongated main body 2; and In the preferred embodiment, each punching step is performed using a punching head 16 having a protruding member 17 which is configured to penetrate the elongated main body 2 and which constitutes the actual punch itself. The punching head 16 is driven by a mechanical or hydraulic press (not shown), advantageously vertical.

Advantageously, in order to push the material surrounding the first through-hole 7 and the second through-hole 8 into the first grooves on the bushings 3, 4, the protruding member 17 has an annular development centred on the axis of the first bushing 3 or on the axis of the second bushing 4 respectively.

Moreover, the protruding member 17 preferably has an inner face 18 facing the central axis 10 and an outer face 19 facing the opposite side, which are arranged in such a way as to converge each towards each other (in the direction of the elongated main body 2). Furthermore, the inner face 18 has a greater inclination than the outer face 19 relative to the central axis 10. In the embodiment shown in FIGS. 7 and 8, the outer face 19 has a cylindrical development about the central axis 10, while the inner face 18 has a conical development.

Figure 8:
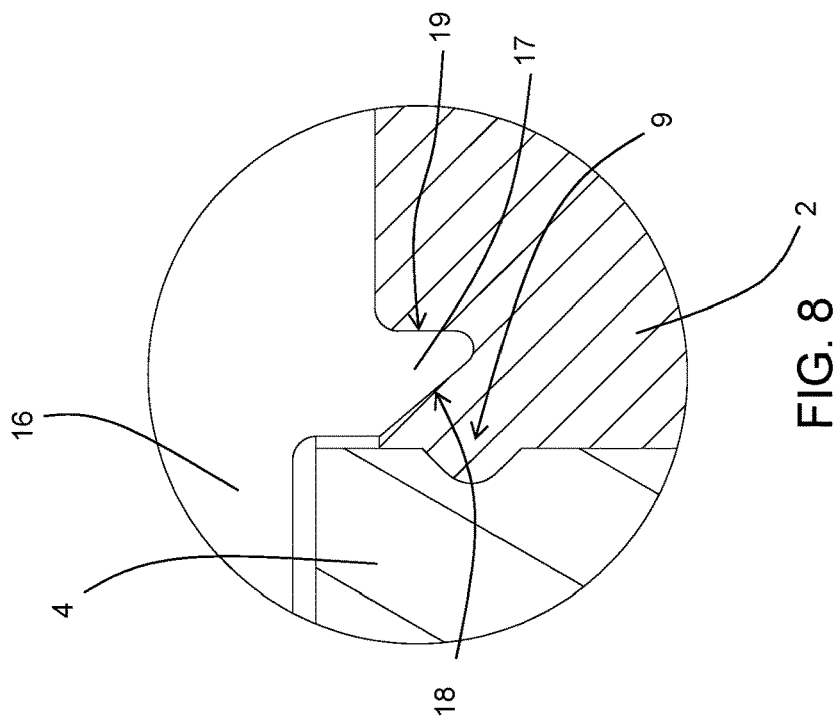
FIG. 8 shows an enlargement of detail VIII in FIG. 7.

FIGS. 6 to 8 show an apparatus 20 for implementing the punching step. FIG. 6, in particular, shows the step of actually punching the right end of the elongated main body 2 and a step of preliminarily positioning the elongated main body 2 and the bushing 3, 4 relative to the left end of the elongated main body 2.

The apparatus 20 comprises, for each end 5, 6, a centring pin 27 on which the respective bushing 3, 4 is positioned, after which the elongated main body 2 is positioned on the bushings 3, 4 (by inserting them into the respective through-hole 7, 8). Only then is the punching head 16 drawn towards the elongated main body 2 and the punch driven into it. As a result of the thrust exerted by the punch, a groove is created on the surface of the elongated main body 2, and the material constituting it is displaced, on one side tightening the bushing 3, 4 and on the other side filling the recess 9, thus causing the bushings 3, 4 to be immovably mounted on the elongated main body 2.

To make the thrust of the punch around the bushing 3, 4 as uniform as possible, a sheet metal press 21 is advantageously used, which is pressed onto the elongated main body 2 before the arrival of the punching head 16, thus ensuring that the elongated main body 2 is correctly seated on the shoulder 13 of the bushing 3, 4.

Finally, also subject to the present invention is a turbocharger assembly 22 for internal combustion engines, comprising a turbocharger 23, a control actuator 24 of the turbocharger 23 and one or more steering rods 1 according to the above. For each steering rod 1 present, the first bushing 3 is connected to an outlet member 25 of the respective control actuator 24, while the second bushing 4 is connected to an actuation member 26 of the turbocharger 23.

Figure 9:
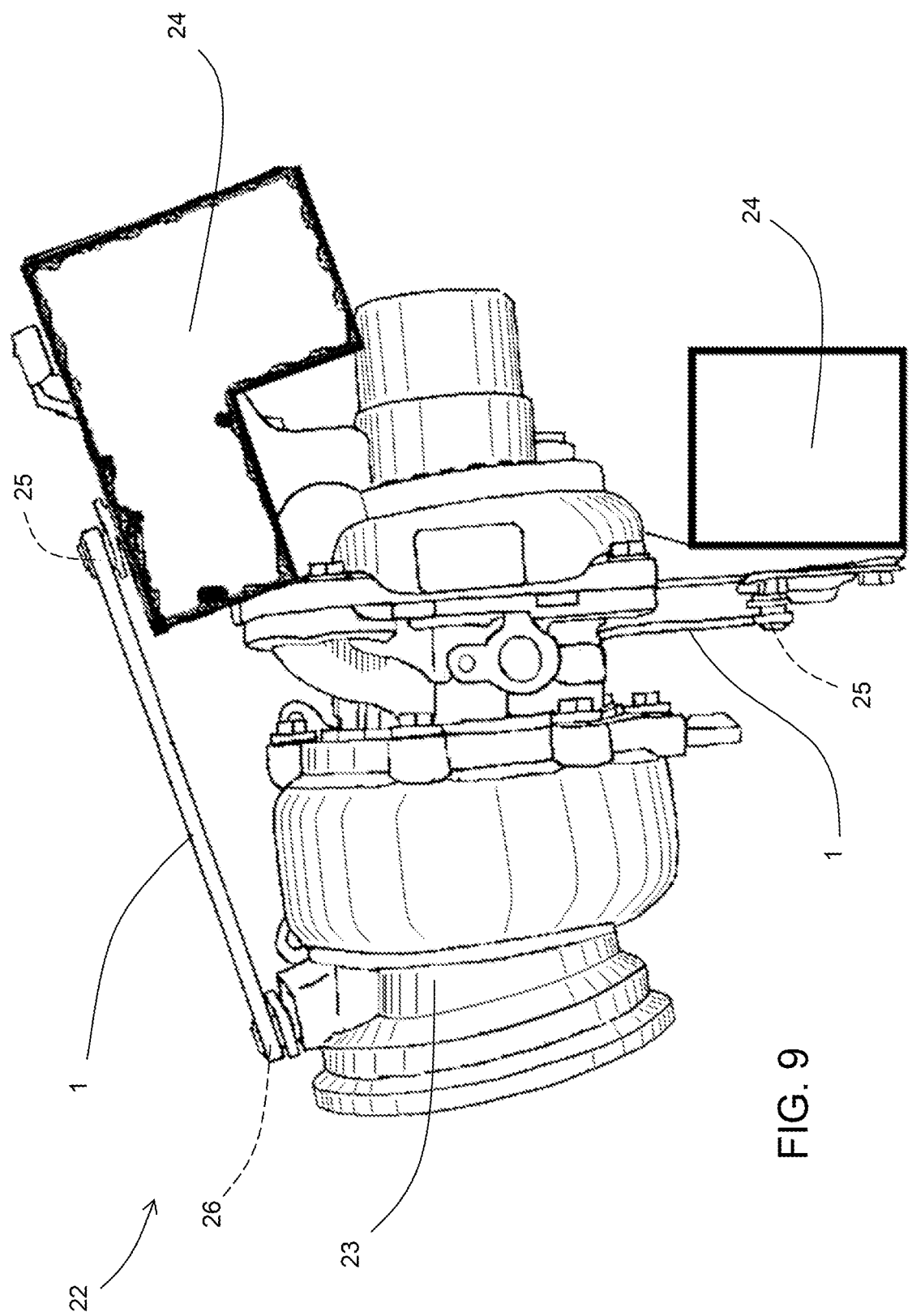
FIG. 9 shows a schematic three-dimensional view of a turbocharger assembly on which are mounted two steering rods made according to the present invention.

An example of such a turbocharger assembly 22, having two steering rods 1 (one for controlling the turbine blades, one for controlling the compressor inlet section), is shown in FIG. 9.

The present invention offers significant advantages.

Indeed, thanks to the present invention, it has been possible to develop a steering rod for turbochargers, and a method to make it, which have a significantly lower cost than was the case in the market up to now, yet which guarantee at least an equivalent performance both in terms of wear resistance and operation.

Finally, it is worth noting that the present invention is relatively easy to make and that the cost associated with its implementation is also not very high. The invention described above may be modified and adapted in several ways without thereby departing from the scope of the inventive concept.

All details can be replaced by other technically equivalent details and any materials, shapes and dimensions of the various components may be used according to requirements.

The invention claimed is:

1. Steering rod for connecting an actuator to a turbocharger drive member, comprising:
   an elongated main body (2), which extends between a first end (5) equipped with a first through-hole (7), and a second end (6) equipped with a second through-hole (8);
   a first bushing (3) fixedly mounted in the first through-hole (7); and
   a second bushing (4) fixedly mounted in the second through-hole (8);
   wherein, moreover:
   the first bushing (3) and the second bushing (4) are made with a respective first material, which has a greater resistance to mechanical wear than a second material which delimits the first through-hole (7) and the second through-hole (8) respectively;
   the first bushing (3) has an outer surface that is in contact with an inner part of the first through-hole (7), and wherein in the outer surface of the first bushing (3) that is in contact with the inner part of the first through-hole (7) there is a radial recess (9) towards a central axis (10) of the first bushing (3), consisting of a first radial annular groove which is centred on the central axis (10) of the first bushing (3) and faces outwards of the first bushing (3), the second material tightening the first bushing (3) preventing it from rotating freely around the central axis (10) and filling the recess (9) preventing the first bushing (3) from being extracted from the first through-hole (7); and
   the second bushing (4) has an outer surface that is in contact with an inner part of the second through-hole (8), and wherein, in the outer surface of the second bushing (4) that is in contact with the inner part of the second through-hole (8), there is a radial recess (9) towards a central axis (10) of the second bushing (4), consisting of a first radial annular groove which is centred on the central axis (10) of the second bushing (4) and faces outwards of the second bushing (4), the second material tightening the second bushing (4) preventing it from rotating freely around the central axis (10) and filling the recess (9) preventing the second bushing (4) from being extracted from the second through-hole (8).

2. Turbocharger assembly comprising a turbocharger (23), a control actuator (24) for the turbocharger (23) and a steering rod (1) according to claim 1, wherein the first bushing (3) is connected to an outlet member (25) of the control actuator (24) and the second bushing (4) is connected to an actuation member (26) of the turbocharger (23).

3. Steering rod according to claim 1 wherein the first bushing (3) and the second bushing (4) each comprise an axially side-by-side first portion (11) and second portion (12), where the second portion (12) protrudes radially outwards relative to the first portion (11) and constitutes a shoulder (13) resting on the elongated main body (2).

4. Turbocharger assembly comprising a turbocharger (23), a control actuator (24) for the turbocharger (23) and a steering rod (1) according to claim 3, wherein the first bushing (3) is connected to an outlet member (25) of the control actuator (24) and the second bushing (4) is connected to an actuation member (26) of the turbocharger (23).

5. Steering rod according to claim 3 wherein each first portion (11) has, on its outside, a first surface parallel to the central axis (10), wherein each shoulder (13) has a support surface (14) perpendicular to the central axis (10), and wherein the first surface is joined to the support surface (14) by means of a second annular groove (15) made in the shoulder (13) and facing the elongated main body (2).

6. Turbocharger assembly comprising a turbocharger (23), a control actuator (24) for the turbocharger (23) and a steering rod (1) according to claim 5, wherein the first bushing (3) is connected to an outlet member (25) of the control actuator (24) and the second bushing (4) is connected to an actuation member (26) of the turbocharger (23).

7. Steering rod according to claim 5 wherein the second annular groove (15) of the first bushing (3) and/or of the second bushing (4) houses a corresponding positive sharp edge of the first through-hole (7) and/or of the second through-hole (8).

8. Turbocharger assembly comprising a turbocharger (23), a control actuator (24) for the turbocharger (23) and a steering rod (1) according to claim 7, wherein the first bushing (3) is connected to an outlet member (25) of the control actuator (24) and the second bushing (4) is connected to an actuation member (26) of the turbocharger (23).

9. Method for making a steering rod for connecting an actuator to a turbocharger drive member, comprising the following work steps:
- make an elongated main body (2) extending between a first end (5) and a second end (6);
- make a first bushing (3) using a material which has a greater resistance to mechanical wear than a material constituting the first end (5);
- make a radial recess (9) on the outer surface of the first bushing (3) consisting of a first radial annular groove which is centred on the central axis (10) of the first bushing (3) and faces outwards of the first bushing (3);
- make a second bushing (4) using a material which has a greater resistance to mechanical wear than a material constituting the second end (6);
- make a radial recess (9) on the outer surface of the second bushing (4) consisting of a first radial annular groove which is centred on the central axis (10) of the second bushing (4) and faces outwards of the second bushing (4);
- pierce the first end (5) to make a first through-hole (7) configured to house the first bushing (3);
- pierce the second end (6) to make a second through-hole (8) configured to house the second bushing (4);
- insert the first bushing (3) and the second bushing (4) into the first through-hole (7) and the second through-hole (8) respectively;
- press a punch against the first end (5) around the first bushing (3) to deform the first end (5) by pushing the material constituting it both against an outer surface of the first bushing (3), to clamp it into the elongated main body (2), and inside the radial recess (9) of the first bushing (3), to prevent axial movements thereof relative to the elongated main body (2); and
- press a punch against the second end (6) around the second bushing (4) to deform the second end (6) by pushing the material constituting it both against an outer surface of the second bushing (4), to clamp it into the elongated main body (2), and inside the radial recess (9) of the second bushing (4), to prevent axial movements thereof relative to the elongated main body (2).

10. Steering rod that is obtainable with the method according to claim 9.

11. Method according to claim 9 wherein each step of pressing the punch is performed using a punching head (16) having a protruding member (17) configured to penetrate the elongated main body (2), and wherein the protruding member (17) has an annular extension centred on the axis of the first bushing (3) and of the second bushing (4) respectively.

12. Method according to claim 11 wherein the protruding member (17) has an inner face (18) facing the central axis (10) and an outer face (19) facing the opposite side, the inner face (18) and the outer face (19) converging towards each other, and wherein the inner face (18) has a greater inclination relative to the central axis (10) than the external face (19).

\* \* \* \* \*